Aug. 12, 1969     N. J. RUMSEY     3,460,886
TELESCOPIC SYSTEM UTILIZING THREE AXIALLY ALIGNED
SUBSTANTIALLY HYPERBOLIC MIRRORS
Filed June 17, 1966

United States Patent Office 3,460,886
Patented Aug. 12, 1969

3,460,886
TELESCOPIC SYSTEM UTILIZING THREE AXIALLY ALIGNED SUBSTANTIALLY HYPERBOLIC MIRRORS
Norman J. Rumsey, Gracefield, Lower Hutt, North Island, New Zealand, assignor to New Zealand Government Property Corporation, Wellington, North Island, New Zealand, a corporation of New Zealand
Filed June 17, 1966, Ser. No. 558,496
Int. Cl. G02b 5/10
U.S. Cl. 350—294                          5 Claims

ABSTRACT OF THE DISCLOSURE

An optical system especially suitable for use as an astronomical camera comprising a primary concave mirror, a secondary convex mirror and a tertiary concave mirror wherein the principle axes of the mirrors are coaxial; and supports for the mirrors, the tertiary mirror being supported without said supports obscuring light rays passing to and from the primary mirror, wherein the primary and tertiary mirrors are in substantially the same plane but have different radii of curvature.

---

Figure 1:
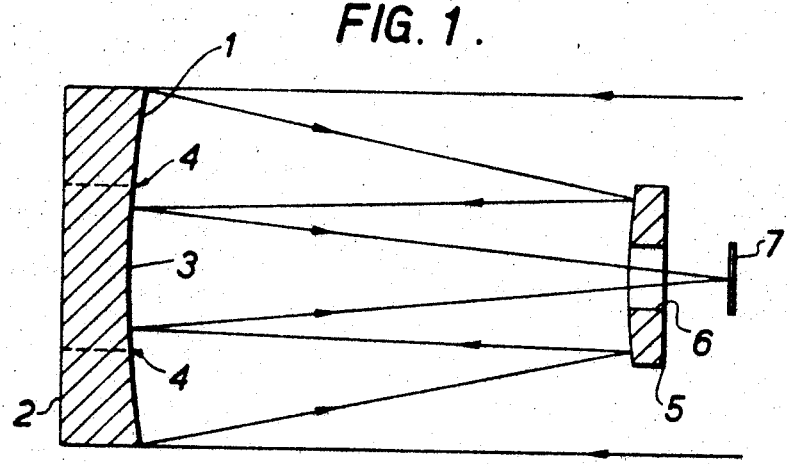

This invention relates to an optical system of concave and convex mirrors especially suitable for use as an astronomical camera, but also suitable for other applications such as collimators and cameras for spectrographs.

When an optical system is used in a camera to photograph very distant objects, it must provide means of controlling the following primary aberrations:
(1) Spherical aberration;
(2) Coma;
(3) Astigmatism;
(4) Field curvature;
(5) Chromatic aberrations, which are eliminated completely by the use of reflecting surfaces only, i.e. a system of mirrors, using no lens components of any kind;
(6) A prescribed focal length; and desirable that it provide
(7) A conveniently accessible image position.

It has long been known that an optical system consisting of two mirrors cannot meet these requirements, and more than once it has been suggested that a system of three mirrors should be used. However, all the particular three-mirror systems suggested in the past have suffered from such a combination of disadvantages that no astronomical camera has ever been constructed in the manner described in any of these earlier suggestions. The most obvious disadvantages of these earlier suggestions have been:

(a) It is a matter of some difficulty to provide a mechanical system that is stiff enough to hold the three mirrors in their correct positions with respect to each other to within the very tight tolerances required, no matter to what point in the sky the camera is pointed.

(b) There must be supports for the secondary and tertiary mirrors. The supports for the secondary mirror must cross the incoming beam of light (as in any conventional system with a secondary mirror), while the supports for the tertiary mirror may have to cross both the incoming beam of light and also that reflected from the primary mirror. Thus the light scattered by the supports in a three-mirror system can greatly exceed that for a two-mirror system. This scattered light reduces the contrast of the image to an objectionable extent in critical circumstances.

(c) Three-mirror systems suffer acutely from vignetting, i.e., a reduction in the effective cross-section of oblique pencils of light relative to the effective cross-section of the beam of light entering the system parallel to its axis, with a consequent fading in brightness of the image away from its centre. This arises because some parts of oblique pencils miss the secondary and tertiary mirrors, or greater parts of the cross-section of oblique pencils are shadowed by the secondary and tertiary mirrors acting together than the part shadowed in the axial pencil.

It is therefore an object of the present invention to provide an optical system which will meet the foregoing desiderata at least in some degree in which the above disadvantages are removed or very greatly reduced, while at the same time the new arrangement has the advantages of a remarkable compactness and of a somewhat reduced labour requirement in the production of the three mirrors.

Accordingly the invention consists in an optical system for focussing light from a distant source onto an image plane comprising a primary concave mirror, a secondary convex mirror and a tertiary concave mirror, the principal axes of said mirrors being coaxial, and supports for said mirrors, the tertiary mirror being supported without the supports obscuring light rays passing to and from said primary mirror, said primary mirror being on the surface of a ring surrounding an imaginary cylinder the axis of which is concentric with said principal axes and which contains said tertiary mirror.

Figure 2:
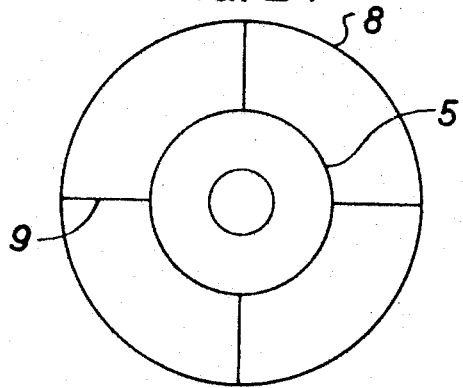

One preferred form of the invention will now be described with reference to the accompanying sketches in which:

FIGURE 1 is a diagrammatic side view of an optical system according to the invention, and
FIGURE 2 is a diagrammatic end view showing the mirror supports.

The invention is based on placing the tertiary mirror (i.e., the third reflecting surface met by the light in its passage through the instrument) in approximately the same position as the primary mirror (i.e., the first reflecting surface met by the light), and also preferably by making the two mirrors of approximately the same curvature. If this is done in the preferred manner, to be described in more detail below, the primary and tertiary mirrors form a single continuous reflecting surface of which a central circular portion, comprising rather less than one quarter of the total area of the surface, constitutes the tertiary mirror, and the remaining outer part of the surface constitutes the primary mirror. This combined reflecting surface is concave, i.e. the primary and the tertiary mirrors are concave. The secondary mirror has a convex reflecting surface, and is supported in front of the primary mirror in the usual manner, e.g. as described in "Telescopes" (University of Chicago Press) edited by Gerard P. Kuiper and Barbara M. Middlehurst. The distance between primary and secondary mirrors can be chosen to put the image in any position that may be considered convenient or desirable. It appears advantageous to allow the light to pass from the tertiary mirror through a hole in the secondary mirror to the image a short distance beyond the secondary mirror, as the image is then most conveniently accessible. The general arrangement of the system is then as shown in FIGURE 1 in which a primary mirror 1 is formed on part of the concave surface of a block 2, e.g. of glass, an inner part of the same concave surface of the block 2 providing a tertiary mirror 3, e.g. between the limits of the arrows 4. A secondary convex mirror 5 is suitably coaxially positioned and the mirror 5 has walls 6 defining a coaxial hole through which the light passes from the tertiary mirror 3 to the image plane 7. The supports for the mirrors and for any film carrying equipment at the image plane 7 follow conventional practice, e.g. by use of a tube 8 (FIGURE 2) with fins 9 holding the secondary mirror and the film carrying equipment (not shown).

It can be seen that the problem of supporting the tertiary mirror in the correct position relative to the primary has been removed, since the tertiary is now an integral part of the primary; nor does this pose any special problem for the manufacture of the mirrors, for, since the primary and tertiary mirror surfaces are continuous with each other they will automatically turn out as accurately co-axial as the inner and outer parts of a single mirror surface. Thus the problem described in (a) above is reduced to attaining and maintaining the correct position of the secondary mirror with respect to the primary. This problem has already been solved in a satisfactory manner as a result of research carried out by designers of the mechanical components of Cassegrain and Ritchey-Chretien telescopes and a description of the solution is to be found in an article by M. Serrurier "Structural Features of the 200 Inch Telescope for Mount Palomar Observatory" Civil Engineering (U.S.A.) Vol. 8, p. 524.

The light scattered by the supports for the tertiary mirror in other three-mirror systems does not arise in the new system, since the tertiary mirror is supported entirely by the primary mirror and no supporting struts are required for it.

The vignetting common in other three-mirror systems is greatly reduced in this system, because the innermost part of the primary mirror, adjacent to the tertiary, reflects some of the marginal rays of oblique pencils that miss the tertiary when ideally they should be reflected from it, and similarly the outermost part of the tertiary, adjacent to the primary, reflects some of the innermost rays of oblique pencils which miss the primary when ideally they should be reflected from it. Since in this preferred form the primary and tertiary mirrors are made to agree perfectly in position and slope where they meet, and the radii of curvature of the profiles of the two mirrors differ only slightly there, each mirror can perform satisfactorily the work of the other within a narrow annulus containing the junction between the two mirrors.

Ideally, the profiles of the primary and tertiary mirrors should agree in radius of curvature as well as in position and slope where they meet. However, if the profiles are described by different algebraic equations of the second degree, they cannot be matched in radius of curvature where they meet as well as in position and slope if they are to remain co-axial, as they must. Thus to the seven conditions that the system must fulfill, previously mentioned, there are now added: that the profiles of the primary and tertiary mirrors should agree where they meet in (8) Position, and
(9) Slope.

It is now possible to see how it is that the new system can meet all these conditions. It has already been pointed out that condition (5): Control of chromatic aberrations, is met by the use of reflecting surfaces only. This leaves eight other conditions to meet. The designer has just eight degrees of freedom with which to meet them:

three axial radii of curvature (one for each reflecting surface),
three eccentricities (assuming that the profiles are given by equations of the second degree), and
two separations (one from axial point of primary mirror to axial point of secondary, and one similarly from secondary to tertiary).

It turns out that if all the primary aberrations mentioned in (1), (2), (3) and (4) above are to be zero, or nearly so, and the other conditions are to be met, then, to the degree of accuracy discussed so far, the reflecting surfaces must all be hyperboloids. The primary is only moderately more eccentric than a paraboloid, the secondary is decidedly more eccentric than the primary, and the tertiary is more eccentric again.

If the degrees of freedom mentioned so far are used to make the primary aberrations zero, then high order aberrations appear. Most, but not all, of these may be removed by assigning asphericities of higher degree than the second to the shapes of the reflecting surfaces. Alternatively, the fundamental data of the system may be adjusted slightly to introduce very small primary aberrations of opposite sign to the high order aberrations. The best possible performance can be secured by a combination of these methods of adjustment.

In systems as described here, the distance between the most widely separated optical surfaces (the tertiary mirror and the image plane) is very close to one third of the focal length. Thus the system is very compact. This, in conjunction with the excellently sharp and flat image, makes it especially valuable for use as an astronomical camera, particularly in the larger sizes. It is of interest to compare this with the dimensions of the Schmidt camera, which is the system commonly used at present by astronomers when they require an instrument of moderately large aperture combined with sharp definition over a wider angle of view than can be obtained with a two-mirror system. In the Schmidt camera the distance between the most widely separated optical surfaces (the aspheric surface of a "correcting plate," and a spherical mirror surface) has to be two focal lengths, i.e., *six* times the most comparable measurement in the new compact camera. Thus it is obvious that this new system will make it possible to build astronomical cameras of much longer focal length than would be feasible economically in the case of a Schmidt. Again, in the Schmidt camera it is usual to have the mirror diameter up to 1.5 times the diameter of the clear aperture in order to avoid vignetting. In the new compact system, the aperture stop is the edge of the primary mirror, and no component needs to be made larger than this.

In the new system, the diameter of the unvignetted image is about one-sixth of the diameter of the primary mirror irrespective of the focal length. This means that, for fixed primary mirror diameter, the angular field of view decreases as the focal length increases. In astronomical photography from the surface of the earth, the faintest star that can be photographed is fainter the longer the focal length of the camera, irrespective of aperture. Thus a compromise must be found between a long focal length to photograph faint stars and a short focal length to secure a wide field. It seems that a good compromise for many purposes is to make the focal length about five times the diameter of the primary mirror. Then the angular diameter of the unvignetted field is 2° closer. This is two-and-a-half to four times as great (so the area of sky is six to sixteen times as great) as can be photographed with typical Ritchey-Chrétien two-mirror systems. Again, though a Schmidt of the same primary mirror diameter would give a distinctly larger field of view as normally constructed, the Schmidt's focal length would be only about 40% that of the system considered here, while its tube length would still be nearly two-and-a-half times as long, and the unobstructed area of its aperture would be barely 60% that of our system. Considerations such as this suggest very strongly that a focal length about five times the diameter of the primary mirror is particularly advantageous when the new system is used for astronomical photography. In this case it turns out that the high order aberrations are so small that an extremely good performance can result from the introduction of small amounts of primary aberrations of opposite sign, and without the use of asphericities of higher degree that the second in the shapes of the reflecting surfaces. In this way, the maximum dimension in angular measure of the image of a point of light at the edge of the unvignetted field can be kept down to one quarter of a second of arc, as determined by geometrical optics. Thus the advantages for manufacture (admittedly slight) of restricting the surfaces to those of the second degree can be retained without prejudice to the practical performance of the instrument in this case, and the example given below is for a system of this type. In cases where a focal length is used which is less than five times the diameter of the primary mirror (for the sake of the larger field of view obtainable) it would be desirable to make use of higher degree asphericities to effect the major control of high order aberrations.

An example will now be given of a prototype camera of 16 inches diameter for the primary mirror and 80 inches focal length. The profiles of the mirrors are given by second degree equations of the form:

$$y^2 = 2rx - sx^2$$

where $r$ is the axial radius of curvature, and $s$ is related to the eccentricity, $e$, by $$s = 1 - e^2$$

The $x$ axis is directed along the optic axis of the system. $t_i'$ is the axial distance from surface $i$ to surface $i+1$, positive if measured from left to right. For the system oriented as shown in FIGURE 1 the specification is:

$r_1 = 77.947\ 88$ inches
$s_1 = -0.526\ 08$
$\quad t_1' = 22.507\ 37$ inches
$r_2 = 38.579\ 78$ inches
$s_2 = -3.031\ 89$
$\quad t_2' = -22.507\ 80$ inches
$r_3 = 77.296\ 90$ inches
$s_3 = -6.903\ 17$
$\quad t_3' = 27.037\ 33$ inches (to image)

It is a further advantage of this type of system that focal lengths different from that of the basic system can be obtained, together with correction of at least spherical aberration and usually coma and sometimes astigmatism also, by use of the primary mirror in conjunction with one or more optical components that replace the secondary mirror. For example, the primary mirror of the numerical example given in the table can be used with a zero power refracting system placed between the mirror and its focus to give a system of just under 39 inches focal length (compared with 80 inches focal length for the original system). The zero power refracting system may be a "correcting plate," i.e. a relatively thin sheet of glass or fused quartz, aspherised to correct the spherical aberration of the mirror. In this case, such a plate is thinner at the centre and edge than at intermediate zones. If it is placed at just under 31 inches from the primary mirror of the example and has a clear aperture of 3.55 inches it corrects the coma as well as the spherical aberration. The field of view is then limited by astigmatism to a maximum of about 18 minutes of arc angular diameter, because the astigmatic circles of least confusion reach an angular diameter of one second of arc just beyond the edge of such a field. Alternatively, the zero power refracting system may be a doublet in which the two components are made of the same material, preferably fused quartz or Schott UK 50 or some other such glass with a good transparency in the near ultraviolet, and with powers that are numerically equal, or nearly so, but of opposite sign, as in the Ross corrector. In this case, the doublet should be placed rather less than 35 inches from the mirror, where it can conrtol astigmatism as well as spherical aberration and coma, so that a relatively extended field of view with good definition can be obtained.

Again, if an alternative convex hyperboloid secondary mirror with $r_2 = 81.3419$ inches and $s_2 = -28.7108$ is placed at $t_1' = 21.7816$ inches from the primary mirror of the example, these two mirrors form a Ritchey-Chrétien system of focal length 67.5 inches, well corrected for spherical aberration and coma.

Yet again, an alternative secondary mirror can always be found that will, in conjunction with the primary mirror, produce a system of any desired focal length and with the final image at any desired distance that is well corrected for spherical abberation and well suited to feeding starlight to a coudé spectrograph.

Thus it will be seen that conventional techniques may be used as well with the primary mirror of a system according to the invention as with primary mirrors of present astronomical cameras.

Though there are advantages described in designing the system so that the primary and tertiary mirrors form a continuous reflecting surface, this invention includes those cases where this arrangement has not been adopted. Alternatives are:

(1) That the tertiary mirror be made on a separate disk inserted as a plug into a central hole in the primary mirror; with the tertiary mirror not necessarily in substantially the same axial position as the primary, but still sufficiently close to the primary to be supported conveniently from behind and independently of the primary mirror so that no supports crossing the beam of light are needed for the tertiary, and (2) That the tertiary mirror be made of substantially shorter radius of curvature than the primary so that, although it is made integrally on the same disk as the primary, it and the primary can be ground and polished separately, each without affecting the other.

It will be seen that in each case the primary mirror is on the surface of a ring surrounding an imaginary cylinder, the axis of which is concentric with the principal axis of the system.

What is claimed is:

1. An optical system capable of forming a sharply defined image of objects in a distant area, said optical system comprising an annular primary concave mirror, a secondary convex mirror having a coaxial aperture therein and a tertiary concave mirror, all three mirrors being substantially hyperbolic, the principal axes of said mirrors being coaxial and said primary and said tertiary mirrors being in substantially the same plane but wherein the axial radii of curvature of said primary and tertiary mirrors are different, supports for said mirrors, the tertiary mirror being supported without the supports obscuring light rays passing to and from said primary mirror, and an image plane facing said secondary mirror but being positioned spaced away from said primary and tertiary mirrors and said image plane facing but being spaced away from said tertiary mirror, light rays falling on said primary mirror being reflected to said secondary mirror from said secondary mirror to said tertiary mirror and from said tertiary mirror through the coaxial aperture in said secondary mirror to said image plane to form a sharply defined image at the image plane of objects in said distant area.

2. An optical system as claimed in claim 1 wherein said tertiary mirror is supported by said primary mirror.

3. An optical system as claimed in claim 2 wherein said tertiary mirror is integral with said primary mirror.

4. An optical system as claimed in claim 1 wherein the reflecting surfaces of said primary and tertiary mirrors agree in position and slope where they meet.

5. An optical system as claimed in claim 1 wherein said tertiary mirror is supported from behind said primary mirror and independently thereof.

References Cited

UNITED STATES PATENTS 2,485,345   10/1949   Ackerman _____ 350—201

OTHER REFERENCES

Cox, "Gleanings for ATM's," Sky and Telescope, April 1964, pp. 242–246.

Mertz, "Configuration for a Large Light Collector," J. Opt., Soc. Am., February 1965, p. IV.

DAVID SCHONBERG, Primary Examiner

J. W. LEONARD, Assistant Examiner

U.S. Cl. X.R.

350—55